3,514,163
POWER BRAKE SYSTEM
Stanley I. MacDuff, South Bend, Ind., assignor to The Bendix Corporation, South Bend, Ind., a corporation of Delaware
Filed Sept. 27, 1962, Ser. No. 226,614
Int. Cl. B60t 11/16; F15b 15/18, 7/00
U.S. Cl. 303—49    2 Claims This invention relates to a manual follow-up brake applicator for a full power braking system. In more detail, this invention discloses the addition of a manual brake cylinder to a full power braking system to allow manual brake actuation, if power braking does not provide the desired braking effect.

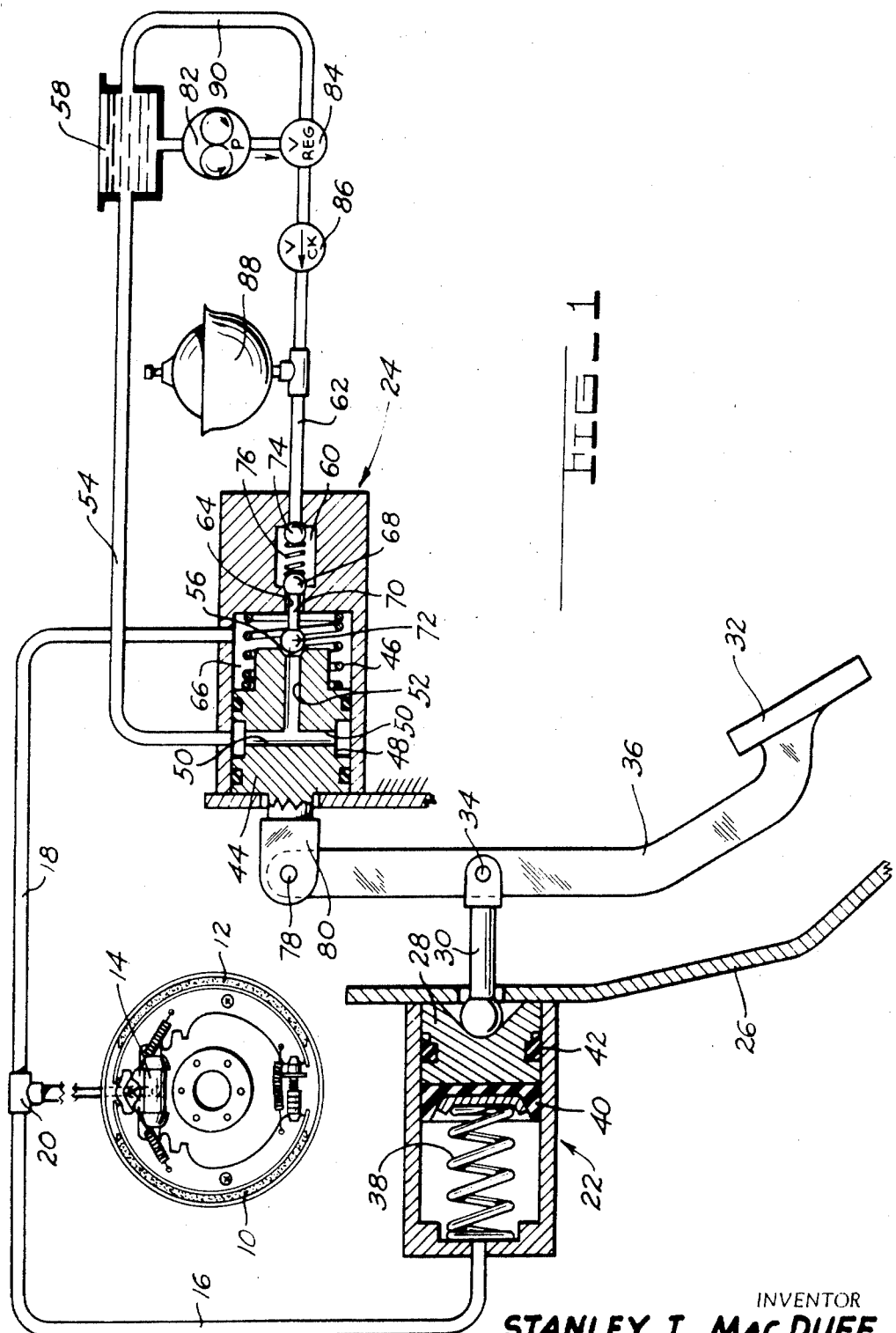

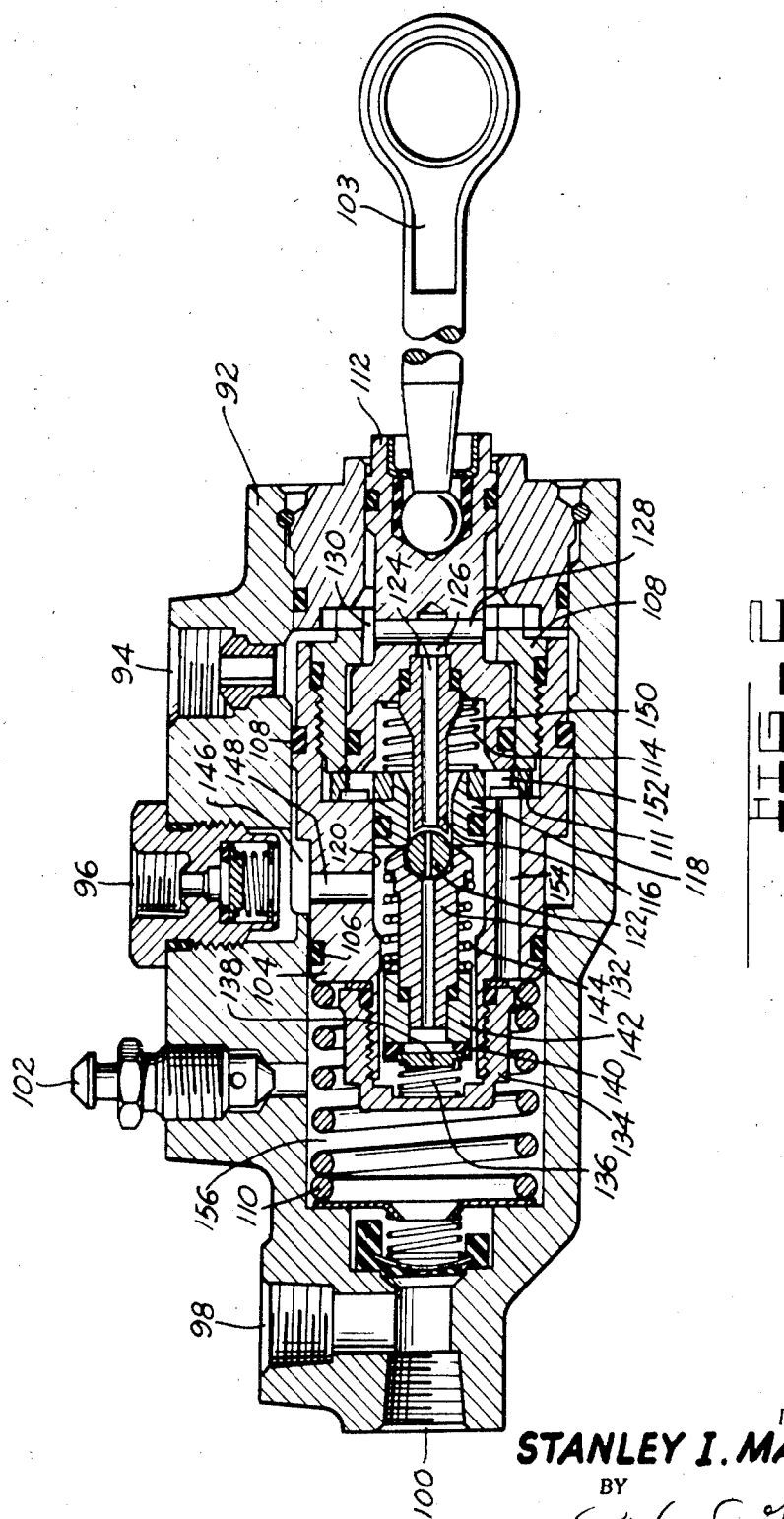

Previous attempts to provide the safety features of my invention have centered about mechanical connections of the master cylinder and brake pedal with automatic means for causing movement of the pedal to actuate a power brake valve, and about the combination of master cylinder and power brake valve, which combination has required pressure responsive devices biasing master cylinder pressure against power system pressure to determine which system is operative.

It is, therefore, an object of this invention to improve upon these safety devices by providing a mechanical safety connection between a power brake system and a conventional brake system.

It is also an object of my invention to provide a safety brake system which is instantaneously activated upon failure of an associated power braking system.

A further object is to simplify a fail-safe full power fluid brake system.

As may be readily appreciated by those skilled in the art other objects and features of my invention appear in the following specification relating to the accompanying drawings wherein:

FIG. 1 is a schematic of a fail-safe full power fluid brake system designed in accordance with the present invention; and FIG. 2 is a sectional view of modified form which my invention may take whereby the power brake valve and master cylinder are combined in one unit.

In the drawing a conventional wheel braking system is shown having drum brake shoes 10 and 12 actuated by a wheel cylinder 14.

A pair of conduits 16 and 18 joined as at 20 with a T fitting, which T fitting leads to the wheel cylinder 14, connect the wheel cylinder to a master cylinder 22 and a power brake valve 24, respectively.

The master cylinder is shown fixedly mounted to the floorboard 26 of a vehicle, and a piston 28 is slidably mounted in the cylinder 22. The piston is operatively connected by a link 30 through the floorboard to a brake pedal 32, as by a pivotal connection 34 with the brake pedal lever 36. As may be readily observed by the schematic, the piston 28 is biased by spring 38 to an inactive position, and appropriate seals 40 and 42 are employed with piston 28 to prevent seepage of a braking fluid past the piston as it slides within cylinder 22.

The power brake valve is schematically shown, as being somewhat similarly arranged, by having a sliding valve body 44 or reaction plunger, as it may be termed. The valve body is slidably mounted and resiliently biased by a spring 46 to an inactive position. In more detail the valve body is provided with an annual land 48 that is connected by lateral passages 50 to an axial passage 52. The land 48 is positioned to afford communication of passage 52 and return line 54 when the valve body 44 is in the inactive position shown by the schematic, which communication is prevented by displacement of the valve body to the right, as viewed in the drawing. The passage 52 terminates in a valve seat 56, which seat is designed such as to allow return flow of braking fluid from wheel cylinder 14 to reservoir 58 through the valve body passages, when the valve is in the extreme left or inactive position as seen in the drawing. In addition, the valve 24 is provided with an additional cavity 60 that is connected with a pressure system through conduit 62. The cavity 60 is connected by a passage 64 to a cavity 66 in which the valve 44 is slidably mounted. The passage 64 is normally closed by a poppet valve 68 in cavity 60 that is connected by a stem 70 to another poppet valve 72 in cavity 66 to form a barbell type valve. A ball check valve 74 allows the introduction of fluid from the pressure system mentioned into cavity 60, but a spring 76 is interposed with the ball check and poppet 68 such that fluid can only flow in one direction through cavity 60, namely towards the valve cavity 66. However, flow in this direction is also prevented until the valve 44 is moved to seat poppet 72 and urge poppet 68 to open. Also, as in the case of the master cylinder, the brake lever 36 is pivotally connected, as at 78, to a valve control rod 80.

The pressure system mentioned may comprise numerous devices. One such system is shown having a pump 82 drawing fluid from reservoir 58 and discharging it through a regualtor valve 84, a check valve 86 and an accumulator 88 to a conduit 62 leading to the power brake valve 24. As may be seen, these units are connected by a number of conduits, and a conduit 90 allows a bypass flow from the regulating valve 84 to be returned to the reservoir 58.

In operation brake pedal depression, due to spring 38 being stronger than spring 46, causes the lever 36 to pivot about the connection 34 such that the master cylinder link 30 acts as a fulcrum. This depression moves the reaction plunger 44 closing the return through the return through line 54 and opening the passage 64 to allow pressure fluid to be supplied to cavity 66 and thence to wheel cylinder 14. The accumulator pressure will then energize the wheel cylinder and also aid spring 38 to hold piston 28 inoperative in that the relationship of pressurized area of the valve 44 to that of piston 28 is such as to allow link 30 to continue as the brake pedal fulcrum.

Should the accumulator pressure be too low to provide the desired braking effect additional depression of the brake pedal 32 will cause the valve 44 to bottom or reach the end of its travel. The valve control rod connection 78 then becomes the fulcrum point and additional force on the brake pedal will result in compression of spring 38 by movement of piston 28 which pressurizes fluid therebehind to activate wheel cylinder 14. Fluid supplied by cylinder 22 cannot exhaust to the pressure system due to check valve 74.

With regard to the unit shown by FIG. 2, I have shown a concentric master cylinder power brake valve combination. In more detail, I have combined these members in a housing 92 having a return or reservoir port 94, an accumulator or pressure port 96, a stop light port 98, a brake system port 100 and a bleed port 102.

In order to operate the concentric unit, I have provided a foot pedal interconnecting control rod 103 that, as shown, is familiarly mounted to a master cylinder piston 104, which piston is provided with appropriate annular seals 106 and 108. Movement of the piston 104 is resisted by a spring 110.

As seen in the drawing, the piston 104 is a hollow structure, and is connected to the interconnecting rod 103 by means of an annular ring 108, which ring is threaded to the piston 104 as seen in FIG. 2 to abut against a plate 111 to hold the plate against internal wall portions of the piston 104. In addition, the ring 108 surrounds a tubular valve actuating member 112 to complete the connection of the piston 104 to the foot pedal interconnecting rod 103. As may also be seen in FIG. 2, the tubular valve actuating member 112 is spring biased to the right, as viewed in FIG. 2, by a spring 114. The tubular valve actuating member is also provided with a projection 116 extending centrally through the spring 114 to project into a valve seat 118, which valve seat is an extension of plate 111 within the small bore 120 of the piston 104. In the normal position shown by FIG. 2, the projection 116 is positioned slightly away from a ball valve 122 so as to allow the ball valve to seat on the valve seat 118. In addition, the projection is provided with a central passage 124 which is aligned with a chamber 126 in the tubular member 112, which chamber is communicated by a transverse passage 128 to an annular chamber 130 about the tubular member 112.

The ball valve 122 is pressed into an enlarged headed end of a tubular support member 132 which extends out through the front end of the piston 104 and which is sealed with respect to the end of said piston by a cap member 134, which cap member provides a resilient abutment for spring 136. The spring 136 is so arranged as to hold a pressure relief plate 138 in sealing relationship with a resilient seat 140, which seat is carried by a collar 142. The collar 142 is centrally bored to receive the tubular support member 132 and forms a base for a suitable coil spring 144, which coil spring biases the tubular member against the ball. In one embodiment, I have found it necessary to maintain the external diameter of the tubular support member 132, the same as the surface diameter on the valve seat member 118 on which the ball 122 abuts so as to hydraulically balance the ball valve. Similarly, I have provided a central opening in the ball valve and tubular projection, as seen in FIG. 2, to assure that control pressure from the passage 124 will at all times exist on the left side of the ball, as seen in the drawing, to prevent pressure from removing the ball from the tubular projection 116.

In operation, a force is applied to the interconnecting rod 103 to first displace the ball valve 122 by the impingement of the projection 116 thereon to open the pressure flow from the accumulator port 96 that is introduced in chamber 146 about the piston 104 and which is fed to the left face of the valve seat 118, as viewed in FIG. 2, by a transverse passage 148, to allow the fluid to flow through the valve seat 118 into a chamber 150. The fluid from chamber 150 is then directed through openings 152 in plate 111 to a passage 154 through the piston 104 to a chamber 156 and thence to the individual brake wheel cylinders. In the event of power failure, the tubular member 112 is further translated to close off the passages 111 so that thereafter the pressure applied to the interconnecting rod will translate the piston 104 to build up pressure in chamber 156, which is closed from the power system, to thereby apply the brakes.

In accordance with the statutes I have explained the construction and operation of one embodiment of my invention. However, I do not propose to be limited to such construction for the true scope and spirit of my invention is only detailed by the appended claims.

I claim:
1. A power brake system comprising:
a power brake control housing including an inlet port for receiving a fluid pressure, a return port for a fluid reservoir, and a discharge port for a pressure responsive braking device;
a valve in said housing operatively connecting said inlet port and said discharge port, which valve includes a slidable element biased by a spring to normally connect said discharge port to said return port;
a piston in said housing and coaxial with said valve, which piston has an axial passage for communicating said port for the pressure responsive device with said slidable element, said piston being biased by a spring to the rear of said housing; and
a pedal interconnecting rod operatively connected to slidable element and to said piston to first move said element and upon bottoming of said element to move said piston.

2. A power brake system comprising:
a power brake control housing including an inlet port for receiving a fluid pressure, a return port for a fluid pressure reservoir and a discharge port for a pressure responsive braking device, said housing having a stepped cavity therewithin;
a piston in said cavity of said housing dividing said cavity into a first variable volume chamber, an intermediate variable volume chamber and a third variable volume chamber, which piston has an axial passage in communication with said third variable volume chamber and a radial passage leading inwardly of said piston from said second variable volume chamber to an internal bore in said piston;
a valve in said bore for controlling communication of said inlet port via said radial passage and said axial passage;
a hollow projection for communicating said axial passage to said first variable volume chamber; and
a valve actuating member in said first variable volume chamber and connected to said projection and arranged to actuate said valve to close off said return port in said first variable volume chamber from said axial passage and thereafter open said radial passage to said axial passage.

References Cited

UNITED STATES PATENTS

| | | |
|---|---|---|
| 2,130,799 | 9/1938 | Hofstetter. |
| 2,343,698 | 3/1944 | Parnell. |
| 2,680,350 | 6/1954 | Sprague et al. |
| 2,757,512 | 8/1956 | Foreman. |
| 2,959,450 | 11/1960 | Gladden et al. |
| 2,992,533 | 7/1961 | Hodkinson. |
| 3,079,757 | 3/1963 | Vicks. |

MARTIN P. SCHWADRON, Primary Examiner

R. B. BUNEVICH, Assistant Examiner

U.S. Cl. X.R.

60—52, 54.5; 91—431; 303—54